United States Patent [19]

Gelbart

[11] 4,456,338

[45] Jun. 26, 1984

[54] ELECTRONICALLY TUNEABLE LIGHT SOURCE

[75] Inventor: Daniel Gelbart, Burnaby, Canada

[73] Assignee: MacDonald Dettwiler & Associates Ltd., Richmond, Canada

[21] Appl. No.: 343,777

[22] Filed: Jan. 29, 1982

Related U.S. Application Data

[63] Continuation-in-part of Ser. No. 240,998, Mar. 5, 1981, abandoned.

[51] Int. Cl.³ ............................................... G02F 1/11
[52] U.S. Cl. ..................................... 350/358; 350/355
[58] Field of Search ..................... 350/358, 355, 356

[56] References Cited

U.S. PATENT DOCUMENTS

| | | | |
|---|---|---|---|
| 3,632,193 | 1/1972 | Kusters | 350/358 |
| 3,639,775 | 1/1972 | Patel | 350/358 |
| 3,644,015 | 2/1972 | Hearn | 350/358 |
| 3,653,765 | 4/1972 | Hearn | 350/358 |
| 3,655,265 | 4/1972 | Hammond | 350/358 |
| 3,687,521 | 8/1972 | Kusters | 350/358 |

Primary Examiner—William L. Sikes
Assistant Examiner—Léon Scott, Jr.
Attorney, Agent, or Firm—Fulwider, Patton, Rieber, Lee & Utecht

[57] ABSTRACT

An electronically tuneable light source which includes a source of white light, an acousto-optic modulator which includes a transparent medium and a means for generating an acoustical wave in the medium and a means for directing the collimated beam of the white light onto the medium at a preselected angle $\theta/2$, to a line which is perpendicular to the direction of travel of the acoustical wave. Interaction of the light beam with the acoustical wave causes diffraction of the light beam. Means are provided for selecting a visible band of the diffracted beam at an angle to the incident collimated beam of light equal to approximately $\theta$.

9 Claims, 4 Drawing Figures

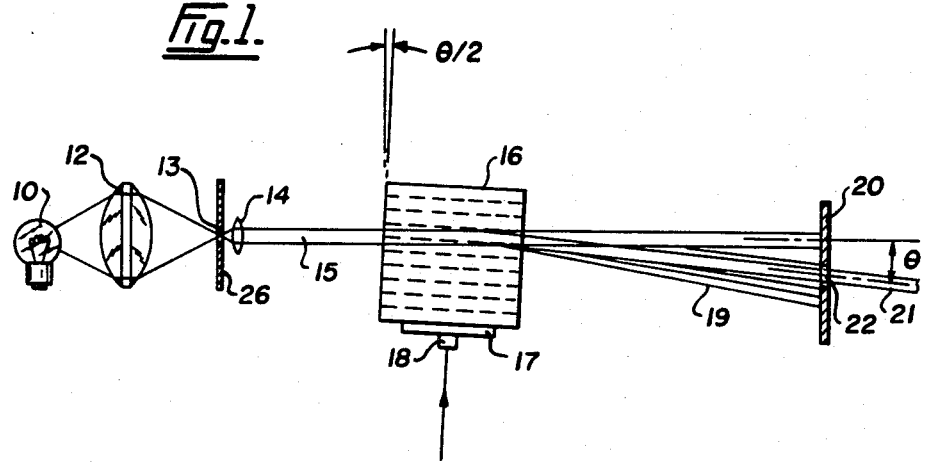
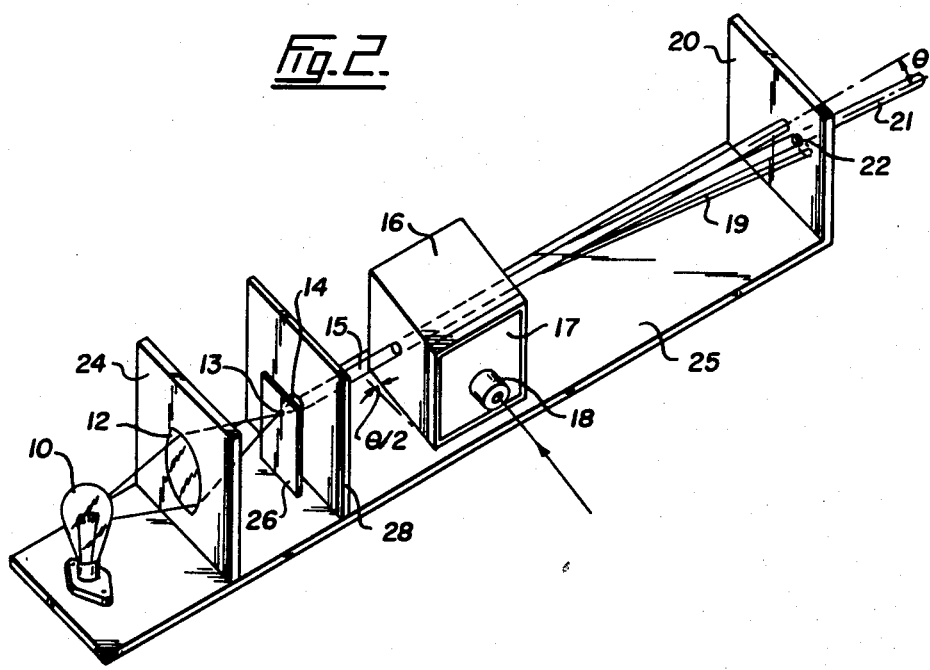

ELECTRONICALLY TUNEABLE LIGHT SOURCE

CROSS-REFERENCE TO RELATED APPLICATION

This is a continuation-in-part of my patent application Ser. No. 06/240,998 filed Mar. 5, 1981 and now abandoned.

BACKGROUND OF THE INVENTION

The present invention relates to a light source in which both the colour and intensity of the light can be changed rapidly be electronic means utilizing an acousto-optic effect.

One method of generating coloured light involves the use of phosphors in combination with impinging electronic beams as is utilized in the colour television industry. However, this method does not produce sufficient light to make it useful for purposes such as high speed image recording.

It is well known that colour separation of white light into its individual colour components can be effected by the use of a prism. Unfortunately such a method is not amenable to high frequency control of either the colour and/or the intensity of the selected beam.

SUMMARY OF THE INVENTION

According to the invention there is provided an electronically tuneable light source which includes a source of white light, an acousto-optic modulator having a transparent medium and means for generating an acoustical wave in the medium. Means are provided for collimating light from the white light source and directing the collimated beam onto the transparent medium at a preselected angle $\theta/2$ to a line which is perpendicular to the direction of travel of the acoustical wave so that the beam is diffracted by the acoustical wave. Means are also provided for selecting a band of the diffracted beam the midpoint of which is at an angle of approximately $\theta$ to the direction of incidence of the collimated beam.

A suitable means of generating the wave is by the use of a transducer coupled to the transparent medium together with the application of a periodic electrical signal applied to the transducer of a selectable frequency and amplitude.

Preferably, the electrical signal applied to the transducer is sinusoidal. As a result, the light which emerges from the selecting means has a wave length and intensity which is related to the frequency and amplitude of the applied sinusoidal electrical signal.

Ordinarily any source of white light may be used such as an incandescent bulb. However, in the event that a high intensity light is required one may employ as the light source a Xenon arc. The light source aforesaid generates coloured light in which both the optical wave length and the intensity can be changed at a high rate by electronic means. The light source is useful, but not limited to, exposing colour film in the process of generating colour images by electronic means. The device may also be used as a source for coloured displays where rapid changes in both colour and intensity are required.

The assembly may include three primary light filters for filtering light from the light source into three respective spectral bands of wavelength λ1, λ2, and λ3, respectively, before entering the modulator. Each filter is removably insertable between the modulator and the light source in response to an external control signal.

The frequency of the acoustical wave generated in the modulator is selected in accordance with the wavelength of the spectral band of light to be transmitted so as to deflect light of the spectral band through an angle $\theta$.

BRIEF DESCRIPTION OF THE DRAWINGS

In drawings which represent a preferred embodiment of the invention,

FIG. 1 is a schematic view of the device showing the relative orientation of the various components thereof, FIG. 2 is a perspective view of the assembled device.

DESCRIPTION OF THE PREFERRED EMBODIMENTS

Figure 3:
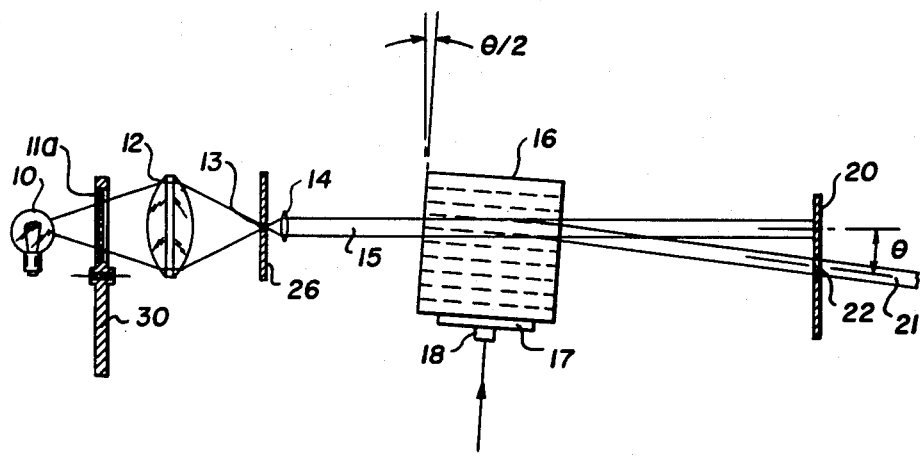
FIG. 3 is a schematic view of an alternate embodiment of the device employing light filters.

Shown in FIG. 1 is a light source consisting of an incandescent bulb 10 light from which is focused by a lens 12 through a small aperture 13 and a second lens 14 into a narrow collimated beam 15. The beam 15 is passed through an Acousto-Optic modulator 16 which is commercially available from Isomet, Coherent Radiation as well as many other suppliers. The operation of the Acousto-Optic modulator is well known in the art as a device for deflecting and modulating laser light. In the present application, however, the modulator 16 acts as an electronically controlled diffraction grating to produce coloured light by reason of the interaction of a transverse acoustic wave set up in the transparent medium with the base 15. The acoustic wave is set up in the modulator 16 by means of applying a sinusoidal electrical signal of frequency f and amplitude A at terminal 18 to a transducer 17 coupled to the transparent medium. The acoustic wave set up in the transparent medium of the modulator 16 will be of a frequency and amplitude dependent on the frequency and amplitude of the signal applied to the transducer 17. The density variations associated with the acoustic wave diffract the collimated beam 15 into its spectral components 19 in a manner similar to a diffraction grating. A fraction of the incident collimated beam 15 passes undiffracted through the modulator 16 and falls onto a plate 20. The plate 20 has an aperture 22 located at an angle $\theta$ with respect to the direction of the undiffracted portion of the incident beam 15 and has a width equal to approximately ¼ of the total width on the plate 20 of the diffracted visible spectrum. In order to achieve the latter diffraction the angle of incidence onto the transparent medium 14, that is the angle that the incident beam 15 makes with a perpendicular to the direction of travel of the acoustical wave in the transparent medium 16, is equal to $\theta/2$. Ordinarily the size of the aperture 22 will be about ¼ of the total size of the visible spectrum on the plate 20 so that it provides a broad band of a particular colour component.

Illustrated in FIG. 2 is an assembly drawing of the device with a portion of the casing removed in order to view the internal parts. On one end of a base plate 25 is mounted an incandescent bulb 10. Adjacent to the bulb 10 is a plate 24 disposed perpendicular to the base 25 and having a central aperture which acts as a mount for the lens 12. Adjacent the plate 24 is a plate 26 having a small aperture 13. Located adjacent the plate 26 is a second lens holder 28 having an aperture for mounting the second lens 14. Lenses 12 and 14 in conjunction with aperture 13 form a collimator. The Acousto-Optic modulator 16 is mounted at a small angle $\theta/2$ to a plane which is perpendicular to the direction of the collimated beam 15 emerging from the second lens 14. At one end of the modulator 16 there is mounted a transducer 17 acoustically coupled to the transparent medium of the modulator 16. A terminal 18 is provided for coupling to an external electrical signal source (not shown). At the end of the base plate 25 opposite the end where the incandescent bulb 10 is mounted is an image plate 20 which contains an aperture 22 such that the angle between the direction of the incident beam 15 and the center of the aperture is equal to $\theta$.

In operation the desired colour of the output beam 21 from the aperture 22 can be selected by changing the frequency f of the sinusoidal signal applied to terminal 18 of the transducer. A given colour will emerge through aperture 22 at an angle according to the following formula:

$$\theta = \frac{\lambda f}{v} \tag{1}$$

where:
$\lambda$ = wavelength of desired colour (in air)
f = frequency of the acoustic wave or the applied sinusoidal signal and
v = the velocity of the acoustic wave inside the transparent medium of the modulator 16.

The size of the aperture 22 determines the spectral purity of the colour beam 21.

The intensity of the colour beam 21 can be changed by changing the amplitude A of the applied sinusoidal signal. The relationship between the light intensity I of beam 21 and the amplitude A of the applied sinusoidal signal is given by the following:

$$I = K_1 \sin^2\left(\frac{K_2 A}{\lambda}\right) \tag{2}$$

where:
$\lambda$ = wavelength of the desired colour, and
$K_1 K_2$ = constants.

As the modulation band width of the Acousto-Optic modulator 16 is inversely proportional to the diameter of the collimated beam 15, the latter beam is made as narrow as required to achieve the desired band width. Since the Acousto-Optic modulator 16 is a linear device more than one frequency may be applied at the same time to the transducer 17. By way of example, if signals with frequencies $f_1$, $f_2$ and $f_3$ with corresponding amplitudes $A_1$, $A_2$ and $A_3$ are applied to transducer 17 at the same time, the output beam 21 will contain wavelengths $\lambda_1$, $\lambda_2$, $\lambda_3$, at corresponding intensities, $I_1$, $I_2$, and $I_3$ with I related to A and f by equations (1) and (2).

Figure 4:
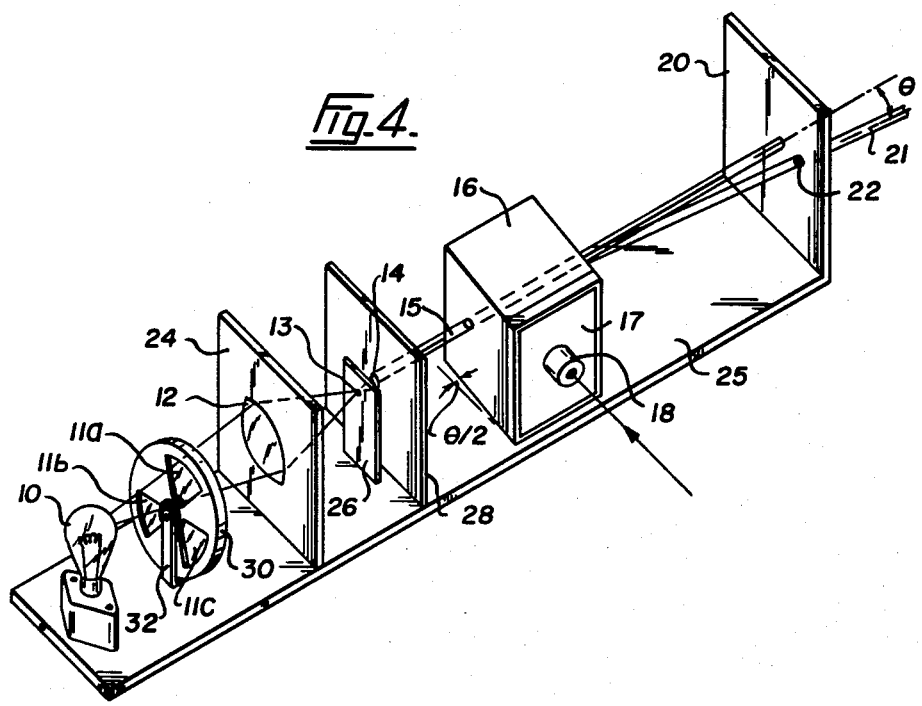
FIG. 4 is a perspective view of the device shown in FIG. 3.

A variant of the assembly of FIG. 1 is shown in FIGS. 3 and 4 in which a set of three primary light filters 11a, 11b and 11c are adapted to be selectably alternately removably inserted between bulb 10 and lens 12 in response to an external control signal (not shown).

The filters are mounted on a wheel 30 at equal spaced apart angular intervals 120° and the wheel 30 rotated through successive 120° increments in response to the external control signal so that at each stop a filter is between the bulb 10 and lens 12. The wheel 30 can be mounted on a stepping motor (not shown) to achieve the 120° rotation. The wheel 30 is mounted to base plate 25 by a bracket 32. Other systems whereby desired filters are removably insertable will be obvious to those skilled in the art.

Each filter 11a, 11b and 11c passes a primary spectral band of light characterized by a wavelength $\lambda_1$, $\lambda_2$ and $\lambda_3$ each different so that the combination of the three bands can produce any colour in the visible spectrum. Thus upon receipt of a given control signal j, a corresponding filter is inserted resulting in light of a spectral band having a wavelength $\lambda j$ passing through the filter and into the modulator 16. A sinusoidal signal of amplitude Aj and frequency fj is applied to the transducer 17 resulting in deflection of light of wavelength $\lambda j$ through an angle $\theta$ so that the latter passes through aperture 22 with an intensity Ij related to the amplitude Aj. The foregoing step is repeated for each of the three filters so that the combined light signals when recorded on a colour sensitive film produces an image of a colour and intensity related to the wavelengths and intensities of the corresponding three component light signals. Thus by the application of amplitude values for each of the three frequencies $f_1$, $f_2$ and $f_3$ an associated colour and intensity of image can be produced on an suitable recording medium such as colour sensitive film.

Other variations, modifications and departures lying within the spirit of the invention and scope as defined by the appended claims will be obvious to those skilled in the art.

I claim:
1. An electronically tuneable light source comprising;
   (a) a source of white light;
   (b) an acousto-optic modulator having a transparent medium;
   (c) means for generating an acoustical travelling wave in said medium;
   (d) means for collimating light from said source and directing the collimated beam of said white light onto said medium at a pre-selected angle $\theta/2$ to the perpendicular to the direction of travel of the acoustic wave whereby said beam is diffracted by the acoustic wave;
   (e) means for selecting a band of the diffracted beam the midpoint of which band is at an angle of approximately $\theta$ to the direction of incidence of the collimated beam.

2. An electronically tuneable light source as defined by claim 1, wherein said means for generating an acoustical wave in said medium includes,
   (a) a transducer coupled to said medium, and
   (b) means for generating a periodic electrical signal of a selectable frequency and amplitude coupled to said transducer such that said transducer generates an acoustical wave in said medium in response to the application to said transducer of said electrical signal.

3. An electronically tuneable light source as defined in claim 2, wherein said periodic electrical signal is sinusoidal whereby the light emerging from the band will have a wavelength and intensity related to the amplitude and frequency of the applied sinusoidal electrical signal.

4. An electronically tuneable light source as defined in claim 3, wherein said means for selecting a band of the diffracted beam is an aperture whose width is equal to approximately ¼ of the total width of the visible light which is diffracted and whose midpoint is at an angle $\theta$ to the direction of incidence of the collimated beam.

5. An electronically tuneable light source as defined in claim 1, 3 or 4 wherein the light source is a Xenon arc.

6. An electronically tunable light source as defined by claims 3, 4 or 5 further including three primary light filters for filtering light from said light source into three respective spectral bands of wavelengths $\lambda_1$, $\lambda_2$ and $\lambda_3$, respectively, before entering said modulator, each filter selectably, removably insertable between said modulator and said light source in response to an external control signal wherein the frequency of the sinusoidal signal applied to said modulator is selected in accordance with the wavelength of the spectral band of light to be transmitted so as to deflect the light of said spectral band through an angle $\theta$.

7. An electronically tuneable light source as defined in claim 1, or 2 further including three primary light filters for filtering light from said light source into three respective spectral bands of wavelength $\lambda_1$, $\lambda_2$ and $\lambda_3$, respectively, before entering said modulator, each filter selectably, removably insertable between said modulator and said light source in response to an external control signal wherein the frequency of said acoustical wave generated in said modulator is selected in accordance with the wavelength of the spectral band of light to be transmitted so as to deflect light of said spectral band through an angle $\theta$.

8. An electronically tuneable light source comprising;
   (a) a source of white light;
   (b) an acousto-optic modulator having a transparent medium;
   (c) a transducer coupled to said medium;
   (d) means for generating a plurality of sinusoidal electrical signals of generally different amplitudes and frequencies coupled to said transducer such that said transducer generates acoustical waves in said medium in response to application to said transducer of the sinusoidal electrical signals;
   (e) means for collimating light from said source and directing the collimated beam of said white light onto said medium at a preselected angle $\theta/2$ to the perpendicular to the direction of travel of the acoustical waves whereby said beam is diffracted by the acoustical waves;
   (f) means for selecting a band of the diffracted beam the midpoint of which band is at an angle of approximately 0 to th direction of incidence of the collimated beam; whereby the light emerging from the band will be a mixture of light components with each component having a wavelength and intensity related to the frequency and amplitude of a corresponding associated sinusoidal wave.

9. An electronically tuneable light source as defined in claim 8, wherein the light source is a Xenon arc.

* * * * *